United States Patent
Hellsten et al.

[11] Patent Number: 5,339,855
[45] Date of Patent: Aug. 23, 1994

[54] USE OF ALKOXYLATED ALKANOLAMIDE AS FRICTION-REDUCING AGENT

[75] Inventors: Martin Hellsten, Ödsmal; Ian Harwigsson, Malmö, both of Sweden

[73] Assignee: Berol Nobel AB, Stenungsund, Sweden

[21] Appl. No.: 91,760

[22] Filed: Jul. 1, 1993

[30] Foreign Application Priority Data

Jan. 31, 1991 [SE] Sweden ............... 9100306-1

[51] Int. Cl.$^5$ .............. F17D 1/16; F17D 1/18; C10M 133/16
[52] U.S. Cl. ............... 137/13; 252/51.5 A; 507/90
[58] Field of Search ............ 252/51.5 A, 8.555, 357, 252/49.3; 137/13

[56] References Cited

U.S. PATENT DOCUMENTS

| | | | |
|---|---|---|---|
| 3,373,107 | 3/1968 | Rice et al. | 137/13 |
| 3,676,344 | 7/1972 | Kuceski | 252/49.3 |

FOREIGN PATENT DOCUMENTS

| | | |
|---|---|---|
| 0147489 | 6/1983 | European Pat. Off. |
| 0146097 | 8/1984 | European Pat. Off. |
| 3050184C2 | 12/1989 | Fed. Rep. of Germany |
| 5980643 | 5/1984 | Japan |
| WO92/13925 | 8/1992 | PCT Int'l Appl. |
| 363092 | 1/1974 | Sweden |
| 425849 | 11/1982 | Sweden |
| 1145740 | 3/1969 | United Kingdom |
| 2093478A | 9/1982 | United Kingdom |

*Primary Examiner*—Prince Willis, Jr.
*Assistant Examiner*—Cephia D. Toomer
*Attorney, Agent, or Firm*—Birch, Stewart, Kolasch & Birch

[57] ABSTRACT

Use of an alkoxylated alkanolamide of general formula (I), $$\underset{\underset{O}{\|}}{R C} NH(A)_n H$$

wherein R is a hydrocarbon group having 7-35 carbon atoms, preferably 9-23 carbon atoms, A is an alkyleneoxy group having 2-4 carbon atoms, and n is 2-20, preferably 3-12, for producing a water-base liquid system with reduced flow resistance between the flowing, water-base liquid system and a solid surface.

11 Claims, No Drawings

USE OF ALKOXYLATED ALKANOLAMIDE AS FRICTION-REDUCING AGENT

This application is a continuation-in-part of PCT international application No. PCT/SE92/00052 which has an international filing date of Jan. 28, 1992 which designated the United States, the entire contents of which are hereby incorporated by reference.

The present invention relates to the use of an alkoxylated alkanolamide in a water-base system for reducing the flow resistance between a solid surface and the water-base liquid system.

It is well-known that the flow resistance of a liquid in a conduit is largely due to the turbulence that arises at the conduit wall. However, much of this turbulence can be prevented by adding to the liquid a sufficient amount of elongate particles. The size of these particles may vary within several orders of magnitude, from severed textile fibre, water-soluble chain molecules down to cylindrical surfactant micelles, i.e. within the range of $10^{-7}-10^{-2}$ m. The reduction of the pressure drop that can be achieved by such additions is considerable, and has, in commercial hot-water systems, been assessed at 75%, which involves corresponding savings in supplied pump energy, or, alternatively, permits further extension of the distributive network with the same pump installations.

In most cases, the addition of fibre is inconvenient, since various filters often are incorporated in circulating liquid systems, and the water-soluble chain polymers are torn by the high shear forces in the pumps and thereby lose their effect.

Surfactants with the ability to form extremely long, cylindrical micelles have, in recent years, attracted a great interest as friction-reducing additives to systems with circulating water, especially those destined for heat or cold distribution.

An important reason for this interest is that, although one desires to maintain a laminar flow in the conduits, one wishes at the same time to have turbulence in the heat exchangers to achieve therein a high heat transfer per unit area.

As may easily be understood, fibre or chain polymers are unable to provide this double function which, however, can be achieved with rod-shaped micelles, since the flow rate (the Reynold's number) usually is much higher in the heat exchangers than in the conduit.

The rod-shaped micelles are distinguished by operating in a fairly disorderly fashion at low Reynold's numbers (below $10^4$) and having no or only a very slight effect on the flow resistance.

At higher Reynold's numbers (above $10^4$), the micelles are paralleled and result in a friction reduction very close to that which is theoretically possible.

At even higher Reynold's numbers (e.g. above $10^5$), the shear forces in the liquid become so high that the micelles start to get torn and the friction-reducing effect rapidly decreases as the Reynold's numbers increase.

The range of Reynold's numbers within which the surface-active agents have a maximum friction-reducing effect is heavily dependent on the concentration, the range increasing with the concentration.

By choosing the right concentration of surface-active agents and suitable flow rates in tubings and heat exchangers, it is thus possible to establish a laminar flow in the tubes and turbulence in the heat exchangers. Thus, the dimensions of both the tubes and the exchangers can be kept at a low level, or the number of pump stations, and consequently the pump work, can alternatively be reduced while retaining the same tubular dimensions.

The surface-active agents hitherto used as friction-reducing additives to circulating water systems—mainly destined for heat or cold distribution—are all of the type alkyltrimethyl ammonium salicylate of the chemical formula

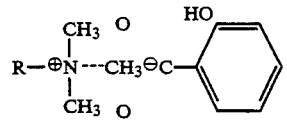

wherein R represents a long alkyl chain which has 16-22 carbon atoms and which may either be saturated or contain one or more double bonds.

This type of surface-active agent functions satisfactorily already at a concentration of 0.5-1 g/l, but is degraded very slowly, both aerobically and anaerobically, and further is highly toxic to marine organisms.

Since heat-distribution systems for small houses usually suffer from important leaks (it is estimated that in one year 60-100% of the water leaks out), it follows that the added chemicals end up in the ground water and in various fresh-water recipients. This combination of low biodegradability and high toxicity is a fundamental criterion for a product injurious to the environment.

Thus, there is a general demand for surface-active agents which are less harmful to the environment but which have the same excellent ability as the quaternary ammonium compounds described above to reduce the flow resistance in circulating water systems.

It has now surprisingly been found that a long since well-known type of non-ionic surface-active agents, namely alkoxylated alkanolamides, are capable of forming long cylindrical micelles. In flow tests in water-base systems, they had a friction-reducing effect well up to the effect achieved by the above-mentioned alkyltrimethyl ammonium salicylate. To be more specific, the invention relates to the use of an alkoxylated alkanolamide of the general formula

wherein R is a hydrocarbon group having 7-35 carbon atoms, preferably 9-23 carbon atoms, A is an alkyleneoxy group having 2-4 carbon atoms, and n is 2-20, preferably 3-12, for producing a water-base liquid system with reduced flow resistance between the liquid water-base system and a solid surface. By 'water-base' is meant that at least 50% by weight, preferably at least 90% by weight, of the water-base liquid system consists of water. The alkoxylated alkanolamide is especially suited for use in water-base systems flowing in long conduits, e.g. circulating water systems for heat or cold distribution. The amount of alkoxylated alkanolamide may vary within wide limits depending on the conditions, but generally is 100-10,000 g/m³ of the water-base system.

The alkoxylated alkanolamide can be produced by amidation of a carboxylic acid of the formula RCOOH, wherein R has the meaning stated above, with an alkanolamine of the formula NHAH, wherein A has the meaning stated above, or by aminolysis of a corresponding triglyceride or methyl ester with the above-mentioned alkanolamine followed by alkoxylation of the resulting amide. The alkoxylation may be carried out in the presence of an alkaline catalyst at a temperature of 150°–180° C.

It is especially suitable to carry out the alkoxylation in the presence of a tertiary amine lacking protons that react with alkylene oxide, or an alkylene-oxide-quaternised derivative of the tertiary amine at a temperature ranging from room temperature to 120° C., which results in high yields of the desired product. Suitable tertiary amines include trimethylamine, triethylamine, tributylamine, dimethyloctylamine, tetramethylethylenediamine, dimethyl coconut amine, tristearyl amine, dimethyl piperazine and diazabicyclooctane.

The alkoxylation may comprise ethoxylation, propoxylation, addition of propylene oxide and ethylene oxide in blocks, simultaneous addition of ethylene oxide and propylene oxide, or a combination thereof. The ethylene oxide conveniently amounts to at least 50 mole % of the added alkylene oxide. To use only ethoxylation is preferred. The carboxylic acids of the formula RCOOH, wherein R has the meaning stated above, may be aliphatic, aromatic as well as cyclo-aliphatic. Suitable carboxylic acids include the aliphatic carboxylic acids in which the hydrocarbon part may be saturated or unsaturated, straight or branched. To use conventional fatty acids is especially preferred.

Suitable alkoxylated alkanolamides include the following specific examples:

wherein

is derived from rape oil fatty acid, $$RCNH(C_2H_4O)_7H,$$

wherein

is derived from rape oil fatty acid,

wherein

is derived from lauric acid,

wherein

is derived from lauric acid,

wherein

is derived from stearic acid, and the group A is random added from equal mole parts of ethylene oxide and propylene oxide

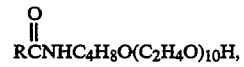

wherein

is derived from linolenic acid.

The choice of chain length and degree of unsaturation is determined by the temperature range in which the alkoxylated alkanolamide is to operate. A higher temperature requires a larger hydrocarbon group and less unsaturation. The choice of the degree of alkoxylation is determined by the size and degree of saturation of the hydrocarbon group as well as by the temperature. Whether the right degree of alkoxylation has been reached is easily established by determining the cloud point of the alkoxylated alkanolamide in a 1% solution in the water-base system. Below the cloud point, i.e. the alkoxylated alkanolamide is solved in the water-base system, the ability of the alkoxylated alkanolamide to reduce the flow resistance increases as the temperature increases, whereas this ability decreases at higher temperatures, at which the alkoxylated alkanolamide is precipitated. Thus, the degree of alkoxylation and the alkyleneoxy group present should be selected in such a manner that the cloud point of the alkoxylated alkanolamide is equal to or slightly below the temperature prevailing in the water-base system at laminar flow, e.g. at Reynold's numbers between $10^4$ and $10^5$. When the temperature of the water-base system varies considerably, e.g. when the system is used as heating medium in long tubings, the cloud point of the alkoxylated alkanolamide should at least exceed the lowest temperature prevailing in the water-base system at laminar flow. Preferably, the cloud point should exceed the highest temperature of the water-base system at laminar flow. Adjustment to the desired cloud point may conveniently be performed by mixing alkoxylated alkanolamides of different cloud points. Such mixtures may also be advantageous when the temperature in the water system at laminar flow varies considerably.

When using the water-base system for cold distribution, it is essential that the Krafft point of the alkoxylated alkanolamide, i.e. the temperature at which the alkoxylated alkanolamide starts to crystallize in the water-base system, is below the lowest temperature in the water-base system. The Krafft point may be decreased by selecting fatty acids with shorter alkyl chains and/or unsaturated fatty acids. A higher degree of ethylation as well as incorporation of soluble salts in the water-base system will also decrease the Krafft point. When used as a cooling medium, the temperature of the water-base system is suitably below 30° C., preferably below 20° C. When the water-base liquid system is a hot water system, this system preferably has a temperature over 60° C.

Apart from the alkoxylated alkanolamide, the water-base system may contain a number of conventional components, such as rust-preventing agents, anti-freeze, and bactericides. The system may also include solubilisers, such as diethylene glycol monobutyl ethers, which may affect the cloud point of the alkoxylated alkanolamides in the water-base system quite considerably.

The present invention will now be further illustrated with the aid of the following Example.

EXAMPLE

Measurements were carried out in a 6-m tube loop consisting of two straight and stainless tubes (3-m each), one tube having an inner diameter of 8-mm and the other having an inner diameter of 10-mm. Water was pumped through the tube loop by a centrifugal pump, which was driven by a frequency-controlled motor, for continuous adjustment of the flow rate, which was determined by a rotameter.

The straight parts of the tube loop had outlets which, with the aid of valves, could in turn be connected to a differential pressure gauge whose other side was all the time connected to a reference point in the tube loop. Further, the tube loop was heat-insulated, and the suction side of the pump was connected to a thermostatically controlled container with a volume of 20 l, to which the return flow from the tube loop was directed.

After the testing compound had been added and the aqueous solution had been thermostatically controlled, measurements began at low flow rates, and the pressure difference from two points on the 10-mm tube and three points on the 8-mm tube were measured #or each flow rate. The pressure differences thus measured were then converted into Moody's friction factor Y and are shown in the Table below as a function of the Reynolds number Re.

$Y = 2D \cdot P_{diff} / V^2 \cdot L \cdot d$ $Re = D \cdot V \cdot d / u$ $D$ = tube diameter $V$ = flow rates $L$ = tube length over which the pressure difference $P_{diff}$ was measured $d$ = density of the liquid $u$ = viscosity of the liquid The Table also states the corresponding Prandtl number and Virk number. The former corresponds to the friction factor of water only, i.e. with turbulence, and the latter corresponds to flow without turbulence.

One of the following compounds was added as testing compound

A. Cetyl trimethyl ammonium salicylate
B. $C_{12-14}$ alcohol + 6 EO
C. 50% by weight of rape oil fatty acid ethanolamide + 3 EO 50% by weight of rape oil fatty acid ethanolamide + 6 EO (The cloud point of the mixture was 56° C. in water)
The following results were obtained.

TABLE 1

| Compound A, addition of 1000 ppm, temperature of 50° C. | | | | |
|---|---|---|---|---|
| | Moody's friction factor · $10^3$ | | | |
| Reynold's number | $10^4$ | $2 \times 10^4$ | $4 \times 10^4$ | $6 \times 10^4$ |
| $8 \times 10^4$ | | | | |
| Prandtl number | 30 | 24 | 22 | 2120 |
| 10 mm | 35 | 15 | 8.0 | 6.017 |
| 8 mm | 30 | 12 | 6.0 | 6.018 |
| Virk number | 10 | 8 | 5.5 | 4.5 |
| 3.0 | | | | |

TABLE 2

| Compound B, addition of 20 g/l, temperature of 80° C., Moody's friction factor | | | | |
|---|---|---|---|---|
| | Moody's friction factor · $10^3$ | | | |
| Reynold's number | $10^4$ | $2 \times 10^4$ | $4 \times 10^4$ | $6 \times 10^4$ |
| $8 \times 10^4$ | | | | |
| Prandtl number | 30 | 24 | 22 | 2120 |
| 10 mm | — | 14 | 14 | 13 13 |
| 8 mm | — | 12 | 15 | 14 14 |
| Virk number | 10 | 8.0 | 5.5 | 4.5 |
| 3.0 | | | | |

TABLE 3

| Compound C, addition of 6000 ppm, temperature of 25° C., Moody's friction factor | | | | |
|---|---|---|---|---|
| | Moody's friction factor · $10^3$ | | | |
| Reynold's number | $10^4$ | $2 \times 10^4$ | $4 \times 10^4$ | $6 \times 10^4$ |
| $8 \times 10^4$ | | | | |
| Prandtl number | 30 | 24 | 22 | 2120 |
| 10 mm | 15 | 9 | 6.0 | 5.00 |
| 8 | 20 | 10 | 6.5 | 11 15 |
| Virk number | 10 | 8.0 | 5.5 | 4.5 |
| 3 | | | | |

As is apparent from these results, the invention gives a friction reduction down to the theoretically possible level (the Virk line), in analogy with prior art results with alkyltrimethyl ammonium salicylate, and this is not possible with common non-ionic surface-active agents of the type fatty alcohol ethoxylate. Compared with the prior-art quaternary ammonium compounds, the friction-reducing agent according to the invention is advantageous in that it is much less toxic to water organisms and is biologically degraded much faster, both aerobically and anaerobically. The friction-reducing agent according to the invention may thus be used as a friction-reducing additive also to heat-distribution systems where there is a certain amount of leakage.

We claim:

1. A method for reducing flow resistance between a solid surface and a flowing, water-base liquid in a water-base liquid system comprising the step of adding at least one alkoxylated alkanolamide having the general formula

wherein
R is a hydrocarbon group having 7–35 carbon atoms,
A is an alkyleneoxy group having 2–4 carbon atoms, and
n is 2–20
to said water-base liquid system.

2. The method for reducing flow resistance between a solid surface and a flowing, water-base liquid in a water-base liquid system according to claim 1, wherein R is a hydrocarbon group having 9–23 carbon atoms and n is 3–12.

3. The method for reducing flow resistance between a solid surface and a flowing, water-base liquid in a water-base liquid system according to claim 1, wherein the at least one alkoxylated alkanolamide has a cloud point that is higher than the lowest temperature of the water-base liquid system at laminar flow.

4. The method for reducing flow resistance between a solid surface and a flowing, water-base liquid in a water-base liquid system according to claim 3, wherein the at least one alkoxylated alkanolamide has a cloud point that is higher than the highest temperature of the water-base liquid system at laminar flow.

5. The method for reducing flow resistance between a solid surface and a flowing, water-base liquid in a water-base liquid system according to claims 1, 3 or 4, wherein the water-base liquid system is a hot-water system having a temperature over 60° C.

6. The method for reducing flow resistance between a solid surface and a flowing, water-base liquid in a water-base liquid system according to claims 1, 3 or 4, wherein the water-base liquid system is a cooling system having a temperature below 30° C.

7. The method for reducing flow resistance between a solid surface and a flowing, water-base liquid in a water-base liquid system according to claim 1, wherein the at least one alkoxylated alkanolamide is added in an amount of 100–10,000 g/cm$^3$ of the water-base liquid system.

8. The method for reducing flow resistance between a solid surface and a flowing, water-base liquid in a water-base liquid system according to claim 1, wherein A is an ethyleneoxy group.

9. The method for reducing flow resistance between a solid surface and a flowing, water-base liquid in a water-base liquid system according to claim 1, wherein at least half of the alkyleneoxy groups are ethyleneoxy groups.

10. The method for reducing flow resistance between a solid surface and a flowing, water-base liquid in a water-base liquid system according to claim 1, wherein the water-base liquid system is at least 50% by weight water.

11. The method for reducing flow resistance between a solid surface and a flowing, water-base liquid in a water-base liquid system according to claim 1, wherein the water-base liquid system is at least 90% by weight water.

* * * * *